United States Patent [19]

Kondo et al.

[11] 4,108,471
[45] Aug. 22, 1978

[54] SEAT BELT SYSTEM

[75] Inventors: Yutaka Kondo; Shuho Nishina, both of Toyota, Japan

[73] Assignee: Toyota Jidosha Kogyo Kabushiki Kaisha, Japan

[21] Appl. No.: 796,323

[22] Filed: May 12, 1977

[30] Foreign Application Priority Data

Jul. 26, 1976 [JP] Japan .................. 51-88876

[51] Int. Cl. ................................. B60r 21/10
[52] U.S. Cl. ................................. 280/747
[58] Field of Search ............ 280/747, 744, 745; 242/107.1–107.15

[56] References Cited

U.S. PATENT DOCUMENTS

| 2,846,745 | 8/1958 | Lathrop | 280/744 |
| 3,421,711 | 1/1969 | Brow et al. | 242/107.11 |
| 3,425,646 | 2/1969 | Hollowell | 242/107.11 |
| 3,847,434 | 11/1974 | Weman | 280/747 |
| 4,032,174 | 6/1977 | Andres et al. | 280/745 |

Primary Examiner—Robert R. Song
Attorney, Agent, or Firm—Koda and Androlia

[57] ABSTRACT

A seat belt retractor wherein in normal use the seat belt is completely extended from the retractor. The seat belt retractor including a base, a retractor shaft rotatably coupled to the base and having a belt passageway formed therein, a means for applying a retractor force to the retractor shaft and a belt passing through the passageway at an intermediate point of the belt whereby one portion of the belt serves as a lap restraining belt and the other portion of the belt serves as a shoulder restraining belt and both the lap and shoulder belts are simultaneously and equally taken up on a single take-up shaft of retractor one over the other shaft by the retracting force.

5 Claims, 9 Drawing Figures

SEAT BELT SYSTEM

BACKGROUND OF THE INVENTION

1. Field of Invention

This invention relates to seat belt retractors and more particularly the seat belt retractors for retracting two seat belts.

2. Prior Art

Among seat belt systems which are used to insure the safety of passengers by securely restraining these passengers during vehicle emergencies such as collisions, etc., three point seat belt systems consisting of lap and shoulder restraining belts are widely employed. Among these three point seat beltsystems, the two belt retracting type of seat belt system has been offered as a system which employs only a single retractor mechanism without injuring the performance of the system.

As shown in FIG. 1, the two belt retracting type of seat belt system 1 consists of a retactor mechanism 2, a continuous restraining belt 3, a tongue plate 4 and a buckle 5. The continuous restraining belt 3 is formed in the shape of an endless loop.

One portion of the belt 3 is made to serve as the lap restraining belt 3A and the remaining portion is made to serve as the shoulder restraining belt 3B. The lap restraining belt 3A and the shoulder restraining belt 3B are taken up on a single take-up shaft of a retractor one over the other in the retracting mechnism 2. The portion of the belt 3 with the lap restraining belt 3A and the shoulder restraining belt 3B meet is passed freely through an opening 6 in a tongue plate 4. Furthermore, the intermediate portion of the shoulder restraining belt 3B is anchored by being freely passed through an eye in an anchor 7 which is fastened to the upper portion of the side wall of a vehicle body.

A seat belt system 1 thus constructed is designed so that the lap restraining belt 3A and the shoulder restraining belt 3B are caused to form a three point seat belt system by means of engaging the tongue plate 4 with the buckle 5 which is anchored near the center line of the vehicle body.

Furthermore, the lap restraining belt 3A and the shoulder restraining belt 3B can be passed freely through an opening 6 in the tongue plate 4. Accordingly, this system has offered improved performance in spite of the fact that only a single retractor mechanism 2 is employed.

The retractor mechanism 2 in this type of seat belt system 1 is equipped with a vehicle inertia sensitive type emergency engagement mechanism which quickly and securely stops the extension of the restraining belts during vehicle emergencies such as collisions, etc. This emergency extension stopping mechnism requires a sensitive sensing device which detects the abrupt deceleration of the vehicle or the abrupt extension of the continuous restraining belt and an engagement mechnism which responds to this sensor by locking the extension of the continuous restraining belt. Such a retractor mechanism has certain advantages but has certain other disadvantages. In particular, the sensitive sensor for the emergency extension stopping mechanism adds complexity to the retractor and detracts from its reliability. Furthermore, typically the sensor for the the vehicle inertia sensitive type emergency engagement mechanism requires that the seat belt retractor be mounted at some particular angle or some particular place in the vehicle.

SUMMARY OF THE INVENTION

Accordingly, it is a general object of the present invention to provide two belt retracing type of seat belt system which requires no vehicle inertia sensitive type emergency engagement mechanism.

It is another object of the present invention to provide two belt retracting type of seat belt system which is simple, easy to manufacture and low in cost.

In keeping with the principles of the present invention, the objects are accomplished by a unique two belt retracting seat belt retractor wherein in normal use the seat belts are completely extended from the retractor. The seat belt retractor includes a base, a retractor shaft rotatably coupled to the base and having a belt passageway formed therein, a means for applying a retracting force to the retractor shaft and a belt passing through said passageway at an intermediate point of the belt whereby one portion of the belt serves as a lap restraining belt and the other portion of the belt serves as a shoulder restraining belt and both the lap and shoulder belts are taken up on a single take-up shaft of retractor one over the other shaft by the retracting force.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DESCRIPTION OF THE INVENTION

Figure 1:
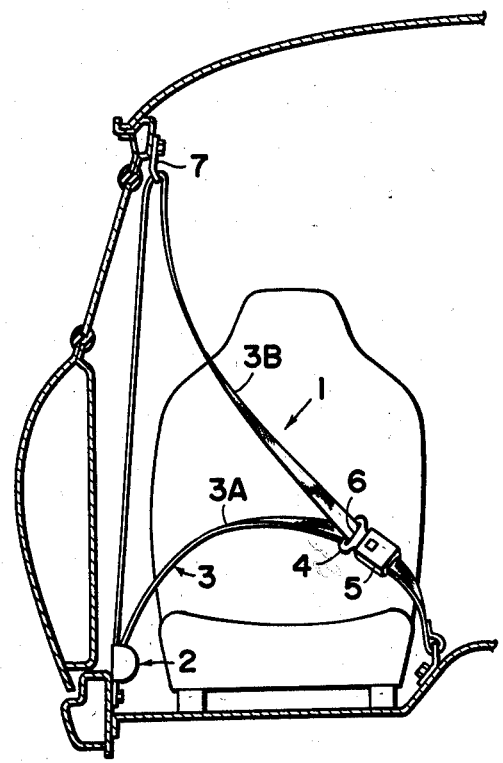
FIG. 1 is a partial cross-sectional view which illustrates a conventional seat belt system of the prior art.
Figure 2:
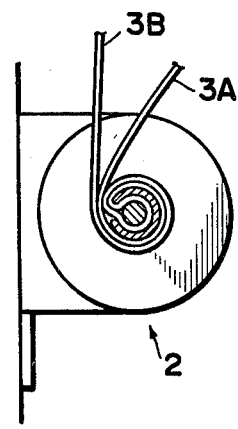
FIG. 2 is a cross-sectional view of a prior art retractor mechanism.
Figure 3:
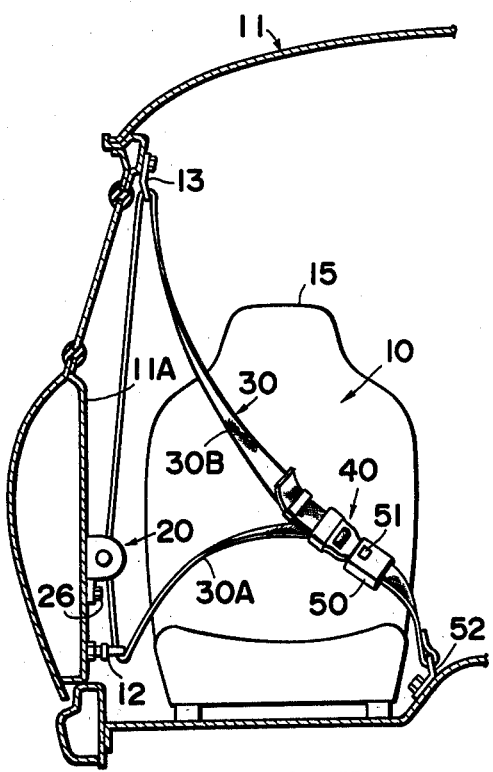
FIG. 3 is a partial cross-sectional view which illustrates a seat belt system in accordance with the teachings of the present invention.
Figure 4:
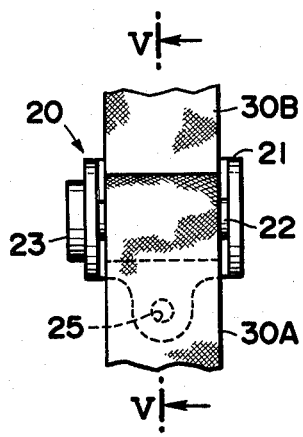
FIG. 4 is a front view of a retractor mechanism of the embodiment of FIG. 3.

Referring more particularly to the drawings, shown in FIG. 3 is a seat belt system in accordance with the teachings of the present invention. The seat belt system 10 in FIG. 3 consists of a retractor mechanism 20, a continuous restraining belt 30, a tongue plate 40 and a buckle 50. One portion of the restraining belt 30 is made to serve as the lap restraining belt 30A and the remaining portion is made to serve as a shoulder restraining belt 30B. The intermediate portion of the belt 30 is rolled up in the retractor mechanism 20.

Figure 5:
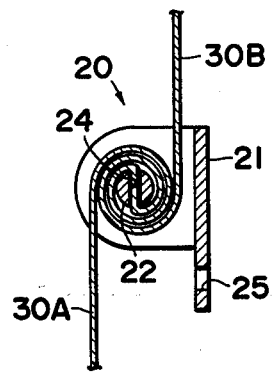
FIG. 5 is a cross-sectional view along the lines V—V in FIG. 4.

The retractor mechanism 20 consists of a case 21, a retractor shaft 22 and a coil spring 23. The case 21 is made from a thin plate which is bent into a U shape. The sides of the U of the case 21 rotatably supports the retractor shaft 22. As shown in FIG. 5, a restraining belt passageway 24 is provided through the center of retractor shaft 22. An intermediate portion of the continuous restraining belt 30 is passed through the passageway 24. Furthermore, the retractor shaft 22 is designed so that the lap restraining belt 30A and the shoulder restraining belt 30B are taken up on a single retractor shaft 22 one over the other (as shown in FIG. 5) by the force of coil spring 23 provided between the case 21 and one end of retractor shaft 22.

An attachment hole 25 is provided in a portion of the case 21 fastened to the side wall 11A of the vehicle body 11 by means of an attachment bolt 26 which passes through the attachment hole 25.

Figure 6:
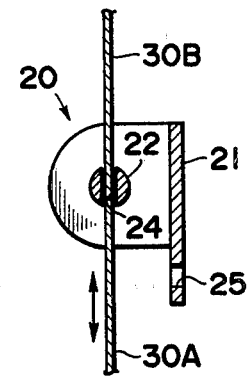
FIG. 6 is an illustration of the operation of a seat belt retractor system in accordance with the teachings of the present invention.

When the intermediate portion of the continuous belt 30 is extended off of the retractor shaft 22 (as shown in FIG. 6), the lap restraining belt 30A and the shoulder restraining belt 30B form a straight line so that the lap restraining belt 30A and the shoulder restraining belt 30B can be freely moved through the passageway 24 in retractor shaft 22.

One end portion of lap restraining belt 30A of continuous restraining belt 30 is taken up in retractor mechanism 20, while the other portion is folded back through a slip joint 12 on the lower portion of side wall 11A of the vehicle body and secured at its end to tongue plate 40.

Figure 7:
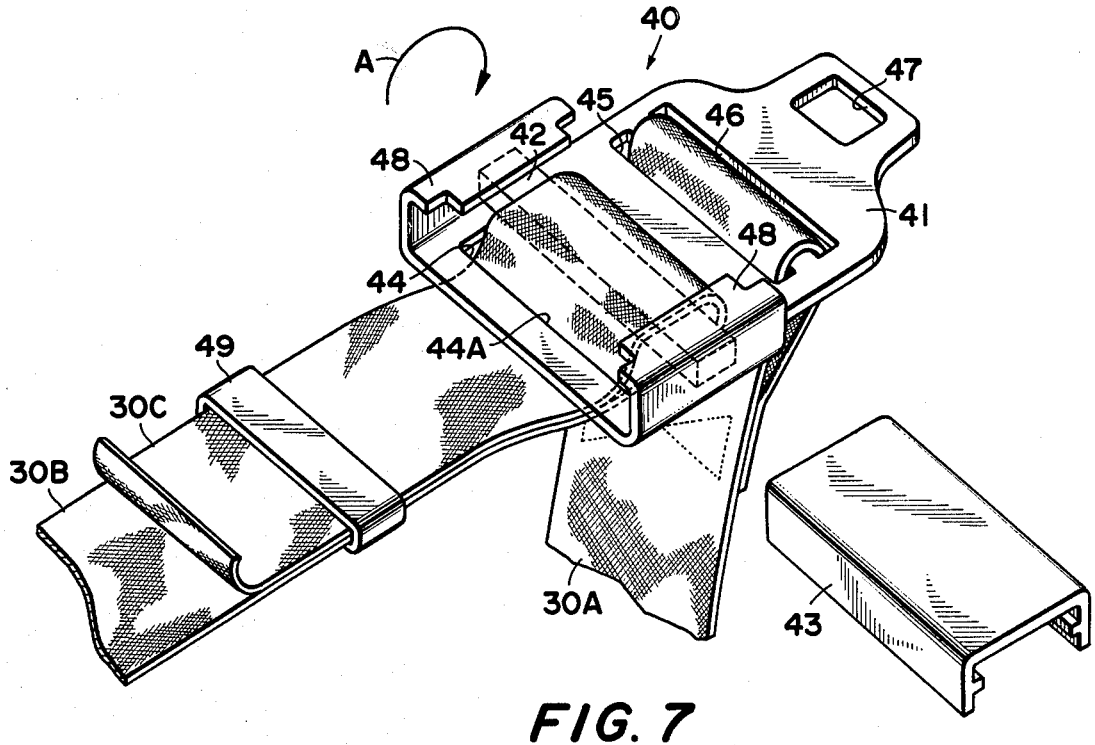
FIG. 7 is an exploded oblique view of a tongue plate.

As shown in FIG. 7, the tongue plate 40 consists of a base plate 41, a lock bar 42 and a cover 43. The base plate 41 is made of sheet steel. A restraining blet passage 44, lap restraining belt anchor holes 45 and 46 and buckle engagement hole 47 are provided in the base plate 41. Furthermore, the base plate 41 at both ends of the passage 44 is bent at right angles to form bent portions 48. The lock bar 42 can be slid along the passage 44 within these bent portions.

The shoulder restraining belt 30B is passed through the restraining belt passage 44, wrapped around the locking bar 42 and again passed through the passage 44 to form an unused portion 30C of the shoulder restraining belt 30B which extends along the shoulder restraining belt 30B.

Thus, when the passenger desires to shorten the length of the shoulder restraining belt 30B, he may easily do so by pulling the unused portion 30C of the restraining belt away from the tongue plate 40. If this is done, the shoulder restraining belt 30B will move around the locking bar 42 and towards the unused portion 30C of the restraining belt 30B so that the total length of the shoulder restraining belt 30B is shortened. Furthermore, when the passenger desires to increase the length of the shoulder restraining belt 30B, he may easily do so by rotating the tongue plate 40 in the direction indicated by arrow A in FIG. 7 and pulling the shoulder restraining belt 30B away from the tongue plate 40 so that the length of the shoulder restraining belt 30B is increased. Furthermore, since the lock bar 42 will be moved toward the end 44A of the passage 44 by the shoulder restraining belt 30B during a vehicle emergency, the unused portion 30C of the restraining belt 30B will be pressed between the lock bar 42 and the end 44A of the passage 44. Accordingly, the length of the shoulder restraining belt 30B will not be allowed to increase and the passenger will be securely restrained so that his safety is guaranteed.

The lap restraining belt 30A is folded back through the anchor holes 45 and 46 in the tongue plate 40 and sewn together so that it is anchored to the tongue plate 40. Cover 43 fits over the bent portions 48 of the tongue plate 40 so that it covers the lock bar 42 and its surroundings. A ring 49 holds the unused portion 30C and the shoulder restraining belt 30B together. Furthermore, the tongue plate 40 is designed so that it may easily be engaged with buckle 50 by means of the engagement hole 47. In addition, it may easily be disengaged from the buckle 50 by pressing the release button 51 on the buckle 50. Also, the buckle 50 is anchored near the center of the ehicle 11 by means of an anchor plate 52. Therefore, a passenger sitting in the seat 15 provided in the vehicle 11 puts the three point seat belt system into use by engaging the tongue plate 40 with the buckle 50. In operation, the vehicle passenger seats in the seat 15, engages the tongue plate 40 with the buckle 50, and adjusts the lengths of the shoulder restraining belt 30B and the unused portion 30C of the restraining belt so that the restraining belts are in a condition of maximum extension from the retractor mechanism 20 (see FIG. 6). It should be apparent that when the length of shoulder restraining belt 30B is adjusted, a portion of either the lap restraining belt 30A or the shoulder restraining belt 30B will slide through the passageway 24 in the retractor shaft 22. By thusly adjusting the belts for use, the body of the passenger is securely restrained by the lap restraining belt 30A and the shoulder restraining belt 30B during a vehicle emergency such as a collision, etc., so that his safety is guaranteed.

Even though in this embodiment only the length of the shoulder restraining belt 30B was described as being adjustable, it is clear that it would also be within the scope of the present invention to make the length of the lap restraining belt 30A adjustable by means of similar means.

From the above description, it should be apparent that the effectiveness of the seat belt is greatly improved by virtue of the fact that the lap restraining belt 30A and the shoulder belt 30B are free to move in a reciprocal manner (i.e., as one is shortened the other is lengthened) while the passenger is using them.

Figure 8:
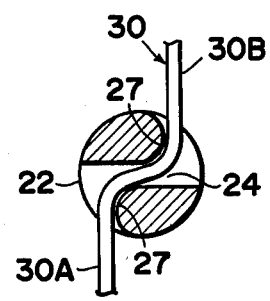
FIG. 8 is a cross-sectional view which illustrates a second embodiment of a retractor shaft utilized in the retractor mechanism of the seat belt system in accordance with the teachings of the present invention.

Referring to FIG. 8, shown therein is a second embodiment of a retractor shaft for use in a retractor mechanism in accordance with the teachings of the present invention. The retractor shaft of FIG. 8 is substantially the same in function as the previously described retractor shaft 22 except that it allows the restraining belt 30 to more freely pass through the restraining belt passageway 24.

Specifically, when the passenger has completely extended the restraining belt 30 from the retractor mechanism 20, there is a possibility due to the fact that the force of the coil spring 23 is acting upon the retractor shaft 22 that the restraining belt 30 will not form a straight line as shown in FIG. 6 but rather will be slightly bent as shown in FIG. 8. Accordingly, by designing the ends of the passageway 24 in the retractor shaft 22 so that it has rounded surfaces 27 (as shown in FIG. 8), it is possible to insure the smooth passage of the restraining belt 30 through the passageway 24. Furthermore, by increasing the degree of circularity of the retracted belt, this makes it possible to slightly reduce the size of the belt roll.

Figure 9:
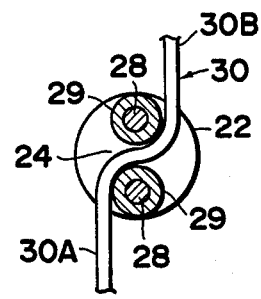
FIG. 9 is a cross-sectional view which illustrates a third embodiment of the retractor shaft of a retractor mechanism in a seat belt system in accordance with the teachings of the present invention.

Referring to FIG. 9, shown therein is a third embodiment of a retractor shaft utilized in a retractor mechanism in accordance with the teachings of the present invention. Again, the retractor shaft 22 is designed to overcome the same difficulties mentioned in the discussion of the second embodiment. In particular, the continuous restraining belt 30 is passed between two parallel shafts 28 located a suitable distance apart. Rollers 29 are provided on these shafts 28 so that they roll on the shafts 28. The rollers 29 decrease the amount of sliding friction between the continuous restraining belt 30 and the retractor shaft 22 and insure smooth movement through the passageway 24.

As described above, the seat belt system provided by this invention is simple in design and effectively improves the useability of restraining belts.

In all cases it is understood that the above described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. A three points seatbelt system wherein in normal use the seatbelt is completely extended and the seatbelt extends diagonally across the shoulder and chest of the user and across the lap of a user, said seabelt system comprising:
   a base;
   a retractor shaft rotatably supported by said base having a belt passageway there through;
   a means for applying a retracting force to said retractor shaft; and
   a continuous restraining belt extending through said passageway in said retractor shaft and the two portions of said belt extending from said shaft form a lap and a shoulder belt, said shoulder belt portion of said continuous restraining belt being drawn upwards and being inserted through an upper slip joint, and said lap belt portion of said continuous restraining belt being drawn downwards and being inserted through a lower slip joint.

2. A seat belt system according to claim 1 wherein said continuous restraining belt is inserted through a tongue plate which is engaged with a buckle anchored on a vehicle body.

3. A seatbelt system according to claim 2 wherein said tongue plate is anchored to one end of said continuous restraining belt and the other end of said continuous restraining belt passes through and is coupled to said tongue plate by an adjustable means such that the length of said continuous restraining belt is adjustable.

4. A seatbelt system according to claim 1 wherein said passageway has rounded corners.

5. A seatbelt system according to claim 1 wherein said belt passageway is provided with rollers.

* * * * *